United States Patent
Vimpari et al.

(10) Patent No.: US 7,978,684 B2
(45) Date of Patent: Jul. 12, 2011

(54) SESSION SET-UP FOR TIME-CRITICAL SERVICES

(75) Inventors: Markku Vimpari, Oulu (FI); Kirsi Rotsten, Nurmijärvi (FI); Marco Stura, Rueglio (IT); Pekka Kuure, Espoo (FI)

(73) Assignee: Nokia Corporation, Espoo (FI)

( * ) Notice: Subject to any disclaimer, the term of this patent is extended or adjusted under 35 U.S.C. 154(b) by 1581 days.

(21) Appl. No.: 10/939,516

(22) Filed: Sep. 14, 2004

(65) Prior Publication Data

US 2006/0045071 A1 Mar. 2, 2006

(30) Foreign Application Priority Data

Jun. 15, 2004 (EP) ..................................... 04014033

(51) Int. Cl.
*H04L 12/66* (2006.01)

(52) U.S. Cl. ........ 370/352; 370/259; 370/353; 455/418; 455/435.1; 455/450; 709/201; 709/226; 709/227; 709/228; 709/229

(58) Field of Classification Search ............. 370/392.52, 370/329, 350, 389, 259–271, 351–356; 455/90.2, 455/414.3, 435.1, 450, 418–420; 709/201–203, 709/223–230
See application file for complete search history.

(56) References Cited

U.S. PATENT DOCUMENTS

| | | | | |
|---|---|---|---|---|
| 6,728,208 B1 * | 4/2004 | Puuskari | ..................... | 370/230.1 |
| 7,106,706 B1 * | 9/2006 | Chaturvedi et al. | ............ | 370/329 |
| 7,107,017 B2 * | 9/2006 | Koskelainen et al. | ........ | 455/90.2 |
| 7,170,863 B1 * | 1/2007 | Denman et al. | ................ | 370/260 |
| 7,330,453 B1 * | 2/2008 | Borella et al. | ................. | 370/338 |
| 7,394,798 B2 * | 7/2008 | Naghian | ......................... | 370/338 |
| 7,477,901 B2 * | 1/2009 | Weston et al. | ................. | 455/453 |
| 7,551,613 B2 * | 6/2009 | Sayeedi | ......................... | 370/389 |
| 2002/0036983 A1 * | 3/2002 | Widegren et al. | ........... | 370/230.1 |
| 2002/0064164 A1 * | 5/2002 | Barany et al. | .................. | 370/401 |
| 2002/0150091 A1 * | 10/2002 | Lopponen et al. | ............. | 370/389 |
| 2003/0093459 A1 * | 5/2003 | Dowling et al. | .............. | 709/201 |
| 2003/0224825 A1 * | 12/2003 | Cox et al. | ........................ | 455/560 |
| 2004/0127251 A1 * | 7/2004 | Thakkar et al. | ............. | 455/552.1 |
| 2004/0223489 A1 * | 11/2004 | Rotsten et al. | ................. | 370/352 |
| 2005/0041578 A1 * | 2/2005 | Huotari et al. | ................. | 370/229 |
| 2005/0041617 A1 * | 2/2005 | Huotari et al. | ................. | 370/328 |
| 2005/0079884 A1 * | 4/2005 | Lazaridis | ....................... | 455/517 |
| 2005/0085234 A1 * | 4/2005 | Wang et al. | .................... | 455/450 |
| 2005/0105511 A1 * | 5/2005 | Poikselka | ...................... | 370/352 |
| 2005/0135374 A1 * | 6/2005 | Isomaki et al. | ............. | 370/395.2 |
| 2005/0232220 A1 * | 10/2005 | Evans | ............................ | 370/349 |
| 2005/0238171 A1 * | 10/2005 | Chen et al. | ..................... | 380/270 |
| 2006/0072526 A1 * | 4/2006 | Rasanen | ........................ | 370/338 |

(Continued)

OTHER PUBLICATIONS

"*3rd Generation Partnership Project; Technical Specification Group Services and System Aspects; End-to-end Quality of Service (QoS) concept and architecture (Release 5)*", GPP TS 23.207 V5.9.0 (Mar. 2004).

(Continued)

*Primary Examiner* — Hemant Patel
(74) *Attorney, Agent, or Firm* — Alston & Bird LLP

(57) ABSTRACT

A session set-up for communicating data via a data network is disclosed. First, a session establishment between a communication apparatus and a serving entity is requested for a service from the serving entity supporting the service. Then, when a requirement of a user connection for the service is determined, an association with a data network for the service is activated via a core network.

24 Claims, 5 Drawing Sheets

U.S. PATENT DOCUMENTS

| | | | | |
|---|---|---|---|---|
| 2007/0010275 | A1* | 1/2007 | Kiss | 455/521 |
| 2007/0171861 | A1* | 7/2007 | Akhtar | 370/329 |
| 2007/0197293 | A1* | 8/2007 | Jalava et al. | 463/40 |
| 2007/0291744 | A1* | 12/2007 | Lundberg et al. | 370/352 |

OTHER PUBLICATIONS

"*3rd Generation Partnership Project; Technical Specification Group Services and System Aspects; IP Multimedia Subsystem(IMS); Stage 2 (Release 5)*", 3GPP TS 23.228 v5.12.0 (Mar. 2004).

"*3rd Generation Partnership Project; Technical Specification Group Core Network; IP Multimedia Call Control Protocol based on Session Initiation Protocol (SIP) and Session Description Protocol (SDP); Stage 3 (Release 5)*", 3GPP TS 24.229 v.58.0 (Mar. 2004).

"*3rd Generation Partnership Project; Technical Specification Group core Network; Policy control over Go interface (Release)*", 3GPP TS 29.207 v5.7.0 (Mar. 2004).

"*Push-to-talk over Cellular (PoC); Architecture; PoC Release 1.0*", Architecture V1.1.0 (Aug. 2003).

"*Push-to-talk over Cellular (PoC); List Management and Do-not-Disturb; PoC Release 1.0*", List Management and Do-not-Disturb V1.1.3 (Aug. 2003).

"*Push-to-talk over Cellular (PoC); Signaling Flows; PoC Release 1.0;*", Signaling Flows V 1.1.3 (Mar. 2003).

"*Push-to Talk over Cellular (PoC) User Plane; Transport Protocols; PoC Release 1.0;*", Transport Protocols V1.1.0 (Aug. 2003).

"*Push-to-Talk over Cellular (PoC); User Requirements; PoC Release 1.0*", User Requirements V1.1.0 (Aug. 2003).

"*Push-to-Talk over Cellular (PoC) User Plane; (E) GPRS/UMTS Specification; PoC Release 1.0*", (E)GPRS/UMTS Specification V1.1.0 (Aug. 2003).

"*3rd Generation Partnership Project; Technical Specification Group Core Network; Signalling flows for the IP multimedia call control based on SIP and SDP; Stage 3 (Release 5)*", 3GPP TS 24.228 v5.8.0 (Mar. 2004).

XP-002324446, "*Push-To-Talk Over Cellular (PoC); Signaling Flows; PoC Release 1.0*", Signalling Flows V1.1.3, Aug. 2003, pp. 1-115.

XP-002316373, "*Push-To-Talk Over Cellular (PoC); Architecture; PoC Release 1.0*", Architecture V1.1.0, Aug. 2003, pp. 1-23.

XP-002346820, "*3rd Generation Partnership Project; Technical Specification Group Services and System Aspects; End-To-End Quality of Service (QoS) Concept and Architecture (Release 6)*", GPP TS 23.207 V6.2.0, Mar. 2004, pp. 1-52.

XP-000863839, "*Push-to-Talk over Cellular (PoC) User Plane; (E)GPRS/UMTS Specification; PoC Release 1.0*", (E)GPRS/UMTS Specification V1.1.0, Aug. 2003, pp. 1-16.

XP-002346819, "*3rd Generation Partnership Project; Technical Specification Group Services and System Aspects; 3GPP Enablers for OMA PoC Services; Stage 2 (Release 6)*" 3GPP TR 23.979 V1.0.0, Jun. 2004, pp. 1-16.

Marshall, W., "*Private Session Initiation Protocol (SIP) Extensions for Media Authorization*", AT&T, Jan. 2003, pp. 1-16.

* cited by examiner

US 7,978,684 B2

SESSION SET-UP FOR TIME-CRITICAL SERVICES

FIELD OF THE INVENTION

In general, the present invention relates to a method and an apparatus for communicating data via a data network in accordance with a service. In particular, the invention relates to a session set-up for time-critical services, e.g. SIP (Session Initiation Protocol) session establishment and PDP (Packet Data Protocol) context activation for a PoC (Push-to-talk over Cellular) service.

BACKGROUND OF THE INVENTION

For a real-time service a user plane connection is to be established and ready to use almost immediately when a user requests the service e.g. by pressing a specific key on his/her user equipment.

However, due to the nature of set-up procedures required for an association with a data network for communicating data according to the service it may take some time from requesting the service until the user is actually provided with a proper data connection.

SUMMARY OF THE INVENTION

It is an object of the invention to provide an improved session set-up for time-critical services.
According to a first aspect of the invention, this object is achieved by a communication apparatus for communicating data via a data network, the communication apparatus comprising:
  requesting means for requesting, for a service, a session establishment between a communication apparatus and a serving entity supporting the service, from the serving entity;
  activating means for activating an association with a data network for the service via a core network; and
  determining means for determining a requirement of a user connection for the service,
  wherein the activating means is configured to activate the association with the data network for the service after a request of the session establishment by the requesting means when the requirement of the user connection for the service is determined by the determining means.
According to a second aspect of the invention, the above object is achieved by a serving entity for supporting a service for a communication apparatus for communicating data via a data network, the serving entity comprising:
  receiving means for receiving a request for a session establishment for a service between a communication apparatus and a serving entity from the communication apparatus;
  processing means for performing the session establishment for the service between the communication apparatus and the serving entity; and
  sending means for sending a session establishment indication indicating the session establishment for the service between the communication apparatus and the serving entity towards the communication apparatus.
According to a third aspect of the invention, the above object is achieved by a network for communicating data between a communication apparatus and a data network in accordance with a service, the service being supported by a serving entity, the network being configured to store a session establishment indication indicating a session establishment between the communication apparatus and the serving entity for the service.
According to a fourth aspect of the invention, the above object is achieved by a network system comprising the communication apparatus, the serving entity and the network.
The present invention may also be embodied as computer program product.
With the present invention a quick session set-up for time-critical services can be provided without increasing the load of a core network.
In the following the invention is described by way of preferred embodiments thereof taking into account the accompanying drawings.

DESCRIPTION OF THE PREFERRED EMBODIMENTS

Figure 1:
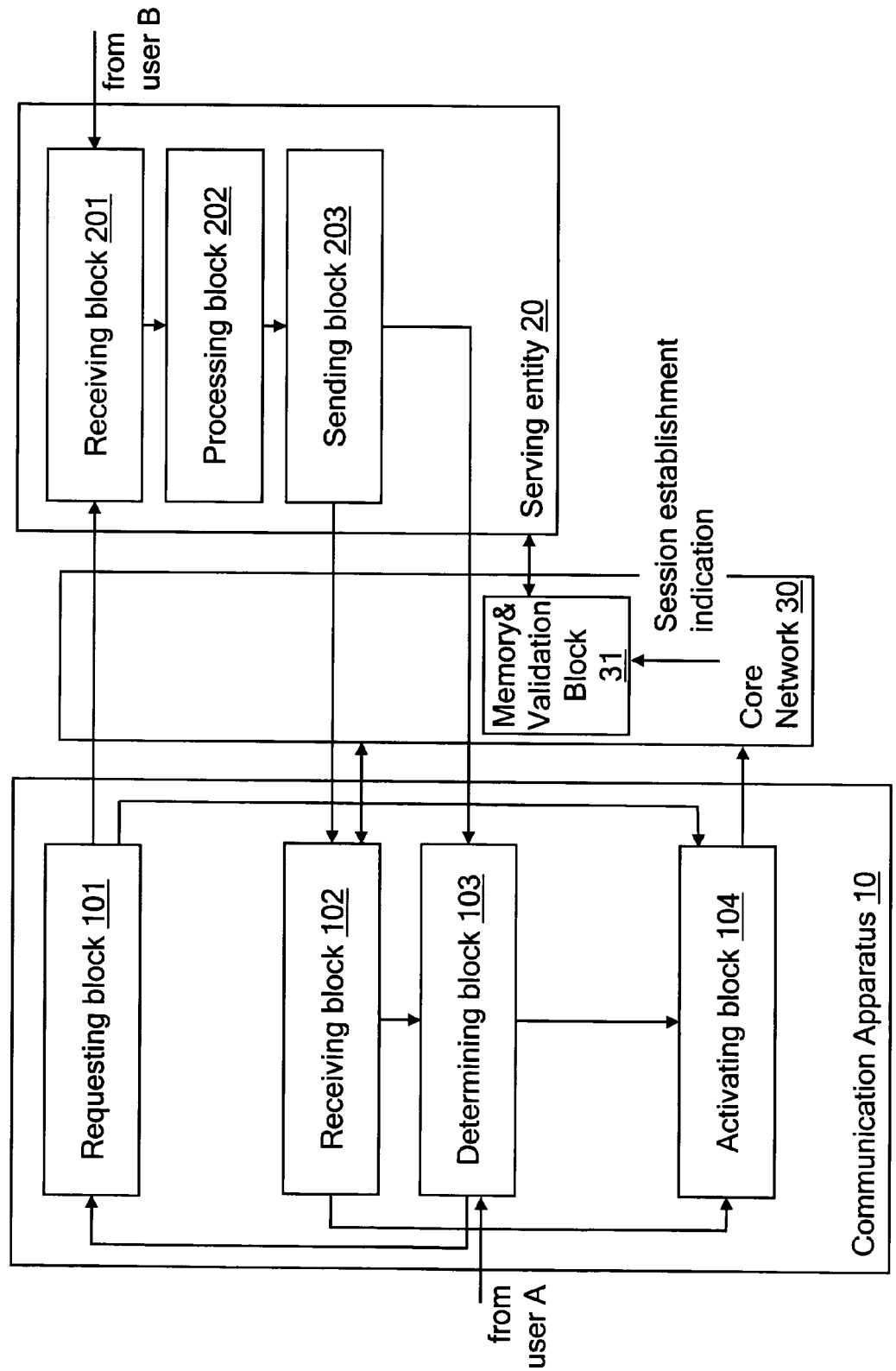
FIG. 1 shows a schematic block diagram illustrating parts of a network system according to an embodiment of the invention.

FIG. 1 shows parts of a network system according to an embodiment of the invention. The illustrated parts are a communication apparatus 10 such as a user equipment UE, a serving entity 20 such as an IMS (IP (Internet Protocol) multimedia subsystem) or an application server in an IMS, and a core network 30 such as a GPRS network providing access to a data network such as the Internet.
The communication apparatus 10 comprises a requesting block 101 for requesting, for a service such as a PoC service to be described later, a session establishment between the communication apparatus 10 and the serving entity 20 supporting the service from the serving entity 20. The communication apparatus 10 further comprises a determining block 103 for determining a requirement of a user connection for the service, and an activating block 104 for activating an association with a data network for the service via the core network 30. According to the invention, the activating block 104 does not activate the association with the data network for the service unless the session establishment is requested by the requesting block 101 and the requirement of the user connection for the service is determined by the determining block 103. The communication apparatus 10 may further comprise a receiving block 102 for receiving a session establishment indication indicating the session establishment for the service from the serving entity 20.
The serving entity 20 comprises a receiving block 201 for receiving the request for the session establishment for the service from the requesting block 101, a processing block 202 for performing the requested session establishment for the service, and a sending block 203 for sending the session establishment indication to the communication apparatus 10 and/or to the core network 30.
The determining block 103 may receive a communication request for the service from a user A of the communication apparatus 10 and determine the requirement of the user connection on the basis of the received communication request. Thereupon, the requesting block 101 may request a session establishment for the service between the communication apparatus 10 and at least one other communication apparatus.

In addition, the receiving block 102 may receive a communication request for the service from the serving entity 20 which in turn may receive the communication request from a user B of another communication apparatus, and the determining block 103 may determine the requirement of the user connection on the basis of the communication request received by the receiving block 102. The communication request may comprise an indication of an instant communication session with the user of the communication apparatus 10, in which case the receiving block 102 may receive the indication of the instant communication session from the serving entity 20 via the core network 30.

The receiving block 102 may forward the session establishment indication to the core network 30 where the session establishment indication may be stored in a memory and validation block 31. Furthermore, the core network 30 may validate the forwarded session establishment indication against an already stored one which may have been received with a primary PDP context activation from the communication apparatus, in which validation procedure the memory and validation block 31 and the serving entity 20 are involved. Alternatively, the session establishment indication is not forwarded to the core network 30, but the core network 30 uses the already stored session establishment indication received with the corresponding primary PDP context activation. The core network 30 may communicate data in accordance with the service on the basis of the stored session establishment indication, i.e. may activate the association with the data network with the session establishment indication.

In other words, the communication apparatus 10 sends a session establishment request to the serving entity 20 e.g. for media negotiation purposes before the user actually requests to have a communication set-up. The association with the data network may be activated when the communication apparatus 10 sends an actual service communication session request (e.g. SIP INVITE or SIP REFER) to the serving entity 20 and/or when the communication apparatus 10 receives such a service communication session request from the serving entity 20 and/or when the communication apparatus 10 receives an instant communication session request from the serving entity 20 via the core network 30 such as an indication about an incoming talk burst in an RTP/RTCP (Real-time Transport Protocol/Real-time Transport Control Protocol) message. When the communication apparatus 10 receives the session establishment indication (e.g. a media authorization token), the communication apparatus 10 does not necessarily activate the association with the data network (e.g. a PDP context) but stores the session establishment indication in order to use it when a user connection requirement is determined.

It is to be noted that the communications between the requesting block 101 and the receiving block 201, and between the sending block 203 and the receiving block 102 and the determining block 103 pass through the core network 30, e.g. using a primary PDP context.

Figure 2:
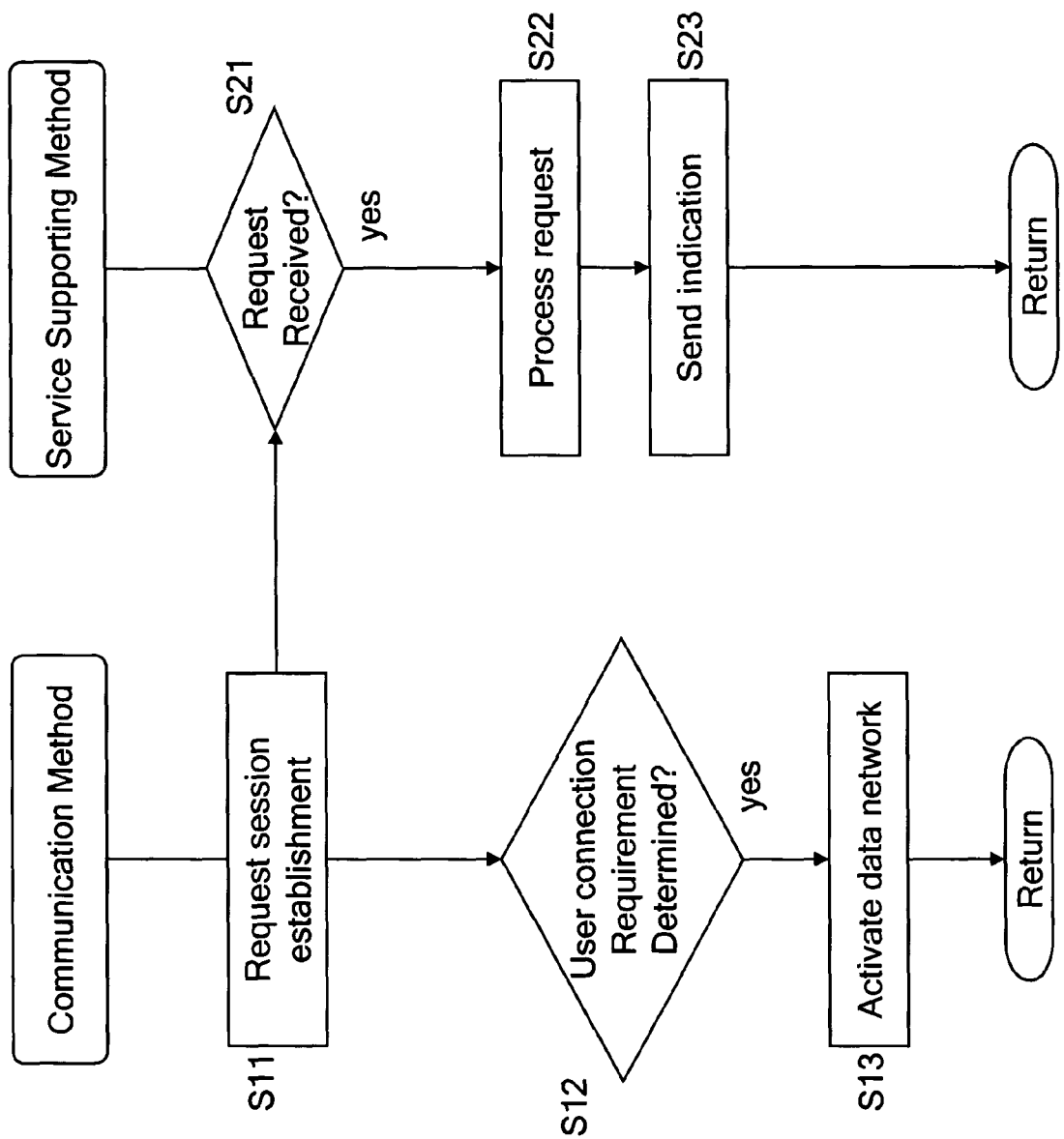
FIG. 2 shows flow charts illustrating processing steps of a communication method and a service supporting method according to the embodiment of the invention.

FIG. 2 shows a flow chart illustrating a communication method which may be applied in a communication apparatus such as the communication apparatus 10, and which may be implemented as a computer program product. In step S11 a session establishment request is sent towards a serving entity such as the serving entity 20, the request forming a pre-session establishment request before the user of the communication apparatus 10 actually requests to have a communication set-up. When a user connection requirement is determined in step S12, an association with the data network is activated in step S13. In case a session establishment indication is received from the serving entity 20 after the request in step S1, this pre-session establishment indication does not activate an association with a data network such as a PDP context but it is waited for a user connection requirement in step S12.

Moreover, FIG. 2 shows a flow chart of a service supporting method which may be applied in a serving entity such as the serving entity 20, and which may be implemented as a computer program product. When in step S21 a session establishment request is received from a communication apparatus such as the communication apparatus 10, in step S22 the request is processed, and in step S23 a session establishment indication is sent towards the communication apparatus 10.

It is to be understood that FIGS. 1 and 2 merely show components which are relevant for understanding the invention, and that the communication apparatus and the serving entity may comprise further components which are necessary for their functioning as e.g. user equipment and application server. Moreover, blocks of the communication apparatus 10 may be combined into a common block for performing the functions of the combined blocks, or functions of a block may be split to further blocks. The same applies to the blocks of the serving entity 20.

In the following, an implementation example of the invention is described. According to the implementation example, the functions of the communication apparatus 10 are implemented by a user equipment UE, and the functions of the serving entity 20 are implemented by an IMS comprising a PoC application server AS supporting the PoC service, a P-CSCF/DNS (Proxy-Call State Control Function/Domain Name Server) and an S-CSCF (Serving-Call State Control Function). In addition, the functions of the core network may be implemented by a GPRS (General Packet Radio Service) network comprising an SGSN (Serving GPRS Support Node) and a GGSN (Gateway GPRS Support Node).

Push-to-talk over Cellular (PoC) is a direct voice service over GPRS. The technology uses the capabilities of the IP Multimedia Subsystem (IMS) as specified by 3GPP for enabling IP connections between mobile phones. The Push to talk service is a two-way form of communications that allows users to engage in immediate communication with one or more receivers, similar to Walkie Talkie, simply by pushing a button on their handsets.

PoC calls, even though being two-way communications, operate in half-duplex manner: while one person speaks, the other(s) listen. The turns to speak are requested by pressing a special push-to-talk button and granted on a first come first served basis. Users can join the group session they wish to talk to and then press the tangent key to start talking.

As described above, the PoC services are real-time services by their nature. Therefore, the user plane connection should be ready to use almost immediately after the special tangent or other "PoC" key is pressed in order to speak. However, due to the nature of the set-up procedures required for a PDP context, it may take a while until a user is actually provided with a proper data connection from the request to have one. For example, the attachment to a PoC group in one-to-many communications and a PoC communication between two user equipments (one-to-one communication) requires a SIP session on the control plane. For example, the PDP context activation together with radio access bearer establishment time in 3GPP release 5 compliant IMS network takes typically longer than three seconds.

For the purpose of facilitating a quick session set-up, the UE could request a pre-INVITE session establishment in order to activate a secondary PDP context and set-up required radio access bearers (RAB) right after a successful $3^{rd}$ party registration to the PoC AS. As the session is "always-on" also the PDP-context is supposed to be always activated, since according to the prior art, if the UE is supporting secondary PDP-context activation, sending a SIP session establishment request normally also activates the secondary PDP context. However, maintaining a real-time PDP context for every PoC subscriber always active would bind a lot of packet core and radio resources.

As described above, according to the invention a pre-session establishment does not activate the PDP context or set-up the RAB before the UE sends an actual PoC communication session request.

Establishing a pre-session means that a PoC terminal or user equipment UE sends a session establishment request (SIP INVITE) to the home AS (e.g. for media negotiation purposes) before the user of the UE actually requests to have a communication set-up. According to the invention, a subscriber is always connected to his/her own anchor PoC AS.

Figure 3:
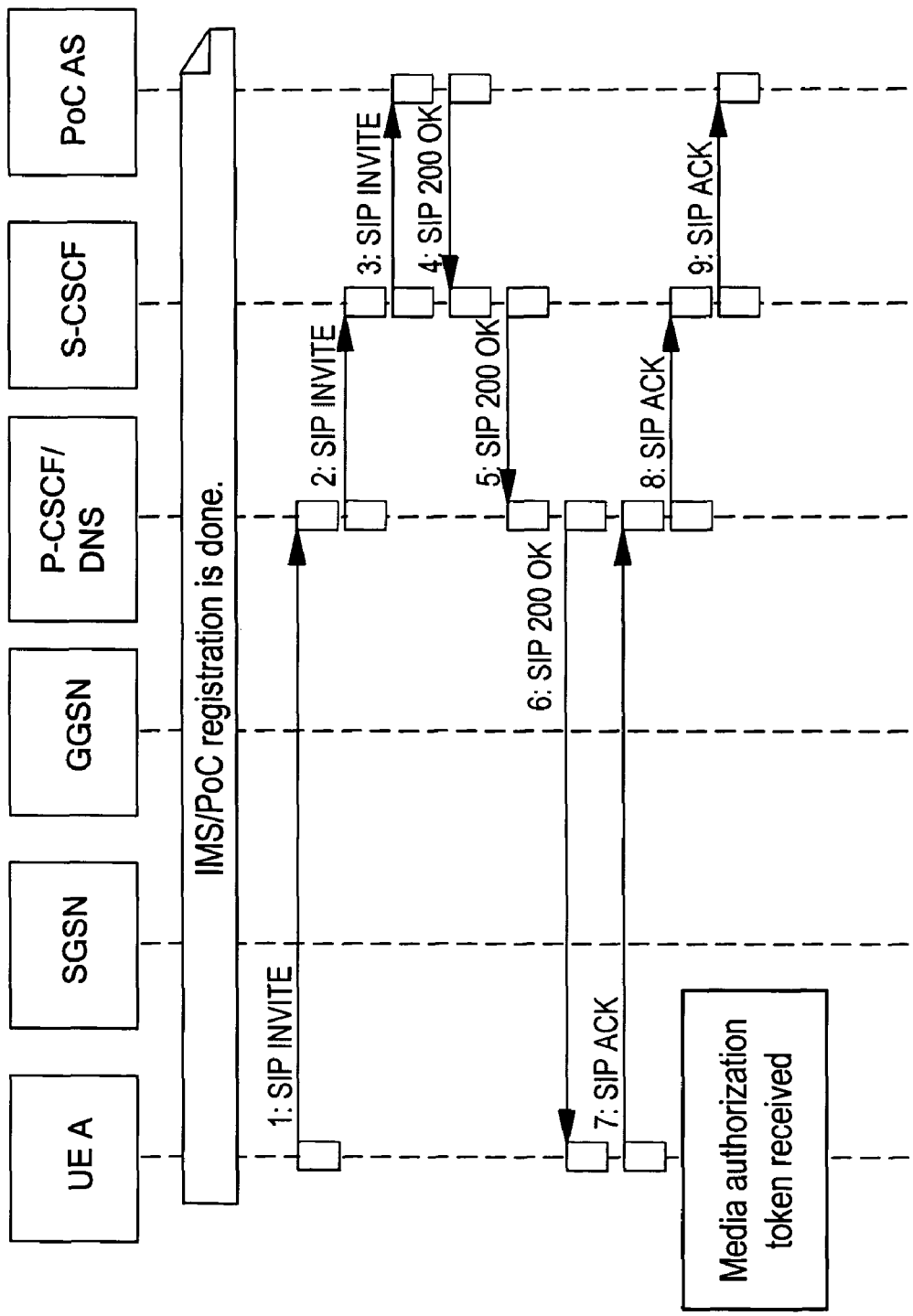
FIG. 3 shows a signaling diagram illustrating a pre-session request according to an implementation example of the invention.

FIG. 3 shows a signaling diagram illustrating the sending of the pre-session request. In communications 1 to 3 a PoC terminal UE A sends a SIP INVITE request right after a PoC registration is done (which usually is a $3^{rd}$ party registration) towards the PoC AS. The routing of the SIP INVITE message bases on a PoC-specific indication in the message. The "always on" session differs from other PoC related session requests since it does not contain a target person or group. The PoC AS responds to the SIP INVITE request with a SIP 200 OK message in communications 4 to 6. The pre-session establishment is acknowledged by the UE A in communications 7 to 9.

As shown in FIG. 3, when the UE A receives a media authorization token from the P-CSCF or a PDF (Policy Decision Function) with the pre-establishment of the session, the UE does not activate a secondary PDP-context for PoC traffic, but stores the authorization token for later use. Reasons for media authorization are security and charging possibilities.

Figure 4:
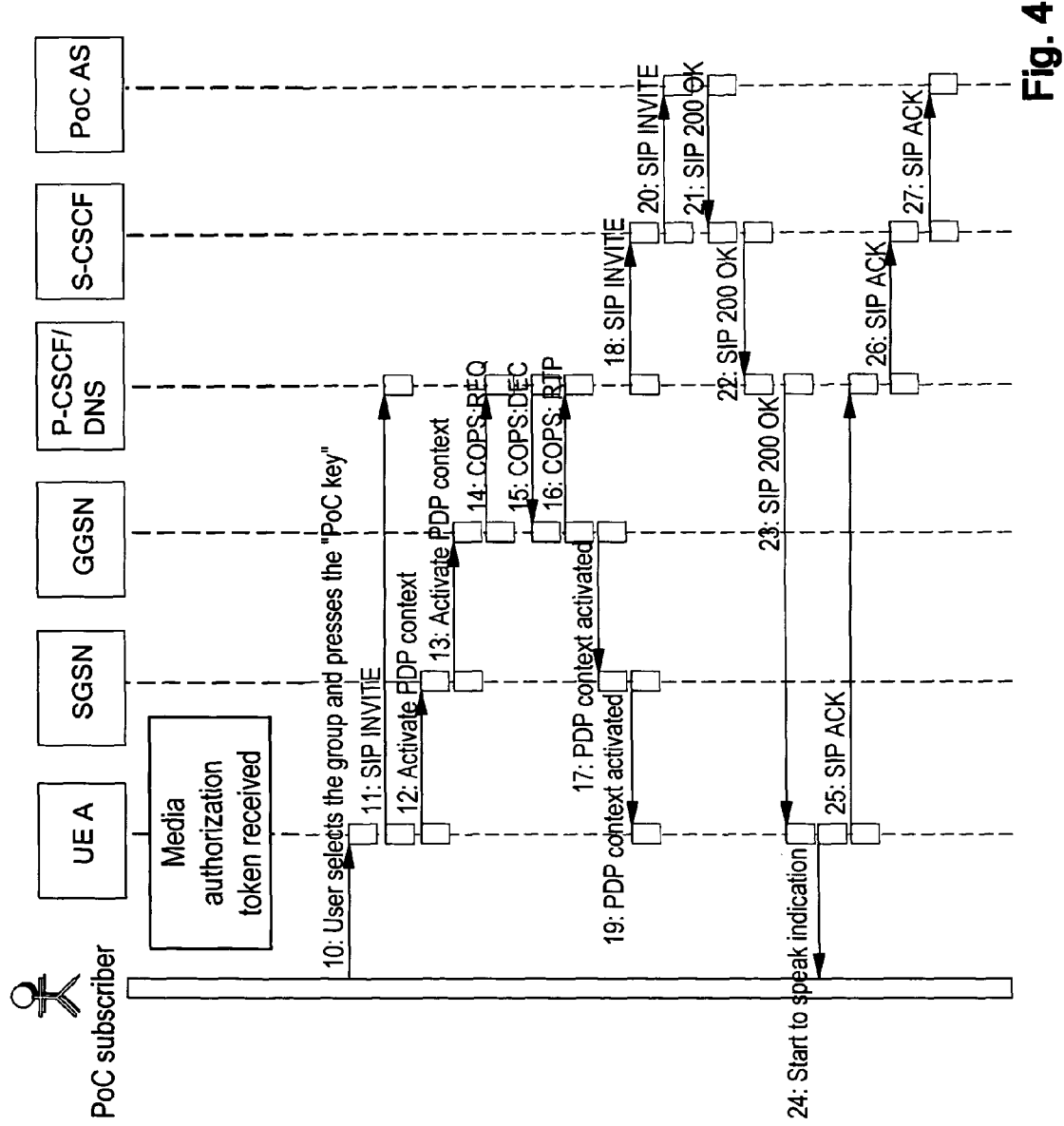
FIGS. 4 and 5 show signaling diagrams illustrating a PDP context activation according to the implementation example of the invention.
Figure 5:
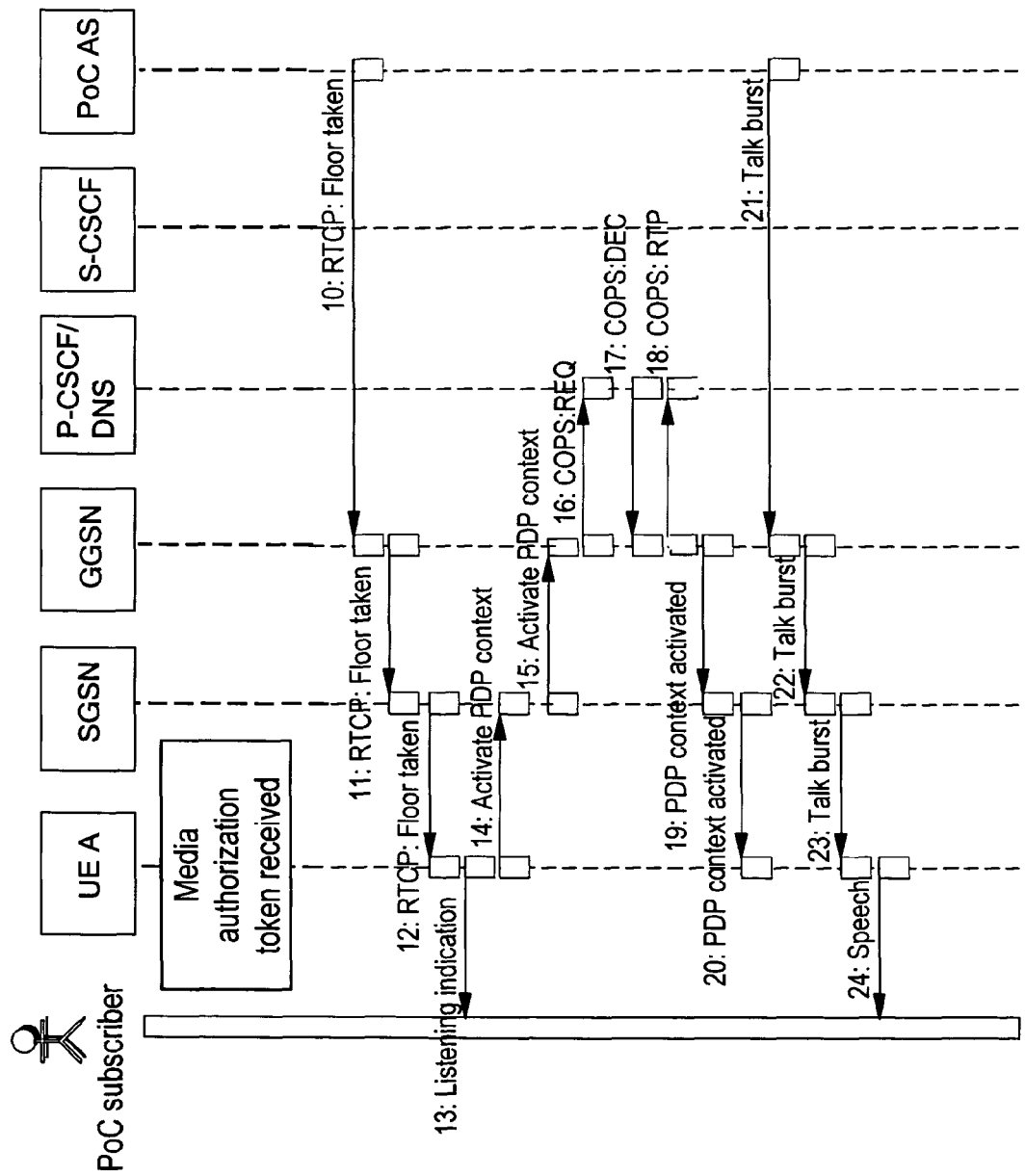

There are several implementation options, when the secondary PDP context activation should be sent. A reason for choosing the secondary PDP context is to provide a better quality of service characteristics for time-critical data, e.g. a Voice over IP stream carrying PoC talk bursts. For example, the secondary PDP context and RAB (Radio Access Bearer) are requested to be activated by the UE A when:

the UE A sends an actual PoC communication session request (SIP INVITE or SIP REFER) as shown in FIG. 4 to be described later, and/or the UE receives a SIP INVITE or SIP REFER request, and/or the UE receives an indication about a coming talk burst in an RTP/RTCP message as shown in FIG. 5 to be described later. This RTP/RTCP message may be sent through a primary "general purpose" PDP context.

FIG. 4 shows a signaling diagram illustrating a PDP context activation when the UE A sends an actual PoC communication session request upon receiving an actual communication request from the PoC subscriber.

In communication 10 in FIG. 4, following the communication 9 in FIG. 3, the PoC subscriber selects a target PoC group to join-in. Thereupon, in communication 11, in order to establish a session, the PoC terminal UE A sends a SIP INVITE request to the P-CSCF. The P-CSCF forwards the SIP INVITE request to the S-CSCF in communication 18 (logically the request is forwarded right away to the S-CSCF and goes parallel with the PDP context activation).

In communication 12, at the same time as communication 11, the UE A requests to activate the PDP context. The UE A may copy the media authorization token in a PDP context activation message. Thus, the media authorization token may be received by the GGSN. The GGSN may store the media authorization token. The PDP context activation is performed via communications 12 to 19. The parallel session establishment is performed via communications 11, 18 to 23 and 25 to 27.

Communications 14 to 16 are required if the network (and its local policy) supports Go-interface and media authorization. In these communications, the GGSN may contact the P-CSCF which generated the media authorization token by using a FQDN (Full Qualified Domain Name) of the P-CSCF which is part of the media authorization token. In communication 17 the PDP context activation is indicated. When the UE A receives a SIP 20x response in communication 23, it may indicate to the user, that he/she can start to talk. If the secondary PDP context is not ready yet, the UE A may send the media via a primary PDP context.

FIG. 5 shows a signaling diagram illustrating a PDP context activation when the UE A receives a PoC communication request, i.e. an indication of an incoming talk burst.

In communication 10 in FIG. 5, following communication 9 in FIG. 3, the PoC AS sends an indication that there is a request to have a one-to-one instant communication session with subscriber A. This indication is transmitted to the subscriber A via communications 10 to 13.

In communication 14 the UE A requests a PDP context activation. The PDP context activation is performed via communications 14, 15, 19 and 20.

Communications 16 to 18 are required if the network (and its local policy) supports Go-interface and media authorization.

In communication 19 the PDP context activation is indicated. In communications 21 to 23 the talk burst is transmitted to the UE A, and in communication 24 the subscriber A hears the speech. If the secondary PDP context is not ready yet, the UE A may send the media via a primary PDP context.

Additionally, as an implementation option, the network (e.g. the GGSN) may store a media authorization token, or a replica of it, received in a primary PDP context activation message in a memory and associate it with the particular UE. This would provide at least two different benefits. If the UE A wishes to create a session immediately after sending the INVITE request, the UE A would not have to wait for the media authorization token for sending the 'Activate (Secondary) PDP context' request message, but it could send it without the media authorization token in P-Header field. The network would then receive the PDP context activation request with an empty P-Header field, but would still be able to perform the media authorization process as the Media Authorization token/or replica of it associated with the UE A is stored in the network. As another benefit, this would enable a media authorization process for legacy terminals that are not able to support the P-Header field in PDP context activation messages. The GGSN may then perform the media authorization on the basis of the stored media authorization token.

Upon session changes, e.g. when media is added, the P-CSCF typically generates a new media authorization token. When the GGSN receives the new media authorization token, it should request authorization from the P-CSCF. Upon successful authorization the GGSN should replace the stored token with the new one. Basically, the GGSN should reauthorize the bearer when a requested QoS (Quality of Service) exceeds an authorized QoS or when a new media authorization token is received.

The above-described pre-INVITE request with the PDP context optimization solution is a fast PoC solution and at the same time saves radio or packet core resources. In other words, the secondary PDP context establishment is optimized with respect to delay and resource usage. The PoC session set-up delay is reduced when compared with on-demand PDP context establishment, and the resource usage is reduced when compared with an early session always-on solution.

In summary, a session set-up for communicating data via a data network is disclosed. First, a session establishment between a communication apparatus and a serving entity is requested for a service from the serving entity supporting the service. Then, when a requirement of a user connection for the service is determined, an association with a data network for the service is activated via a core network.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus, comprising:
at least one processor and at least one memory storing computer program code, wherein the at least one memory and stored computer program code are configured, with the at least one processor, to cause the apparatus to at least:
cause request, for a service, of pre-session establishment between a communication entity and a serving entity supporting the service, from the serving entity, the pre-session being entered into from an inactive state,
cause activation of an association with a data network for the service via a core network, and
determine a requirement of a user connection for the service, wherein
the at least one memory and stored computer program code are configured, with the at least one processor, to cause the apparatus to cause request of the pre-session establishment by causing the apparatus to cause request of the pre-session establishment before determining the requirement of the user connection, and wherein
the at least one memory and stored computer program code are configured, with the at least one processor, to cause the apparatus to cause activation of the association with the data network for the service by causing the apparatus to cause activation of the association with the data network for the service after the request for the pre-session establishment when the requirement of the user connection for the service is determined, wherein
the at least one memory and stored computer program code are configured, with the at least one processor, to further cause the apparatus to receive a pre-session establishment indication indicating the pre-session establishment for the service from the serving entity, the pre-session establishment indication comprising a media authorization token.

2. An apparatus according to claim 1, wherein the at least one memory and stored computer program code are configured, with the at least one processor, to further cause the apparatus to receive a communication request for the service from a user of the apparatus and to determine the requirement of the user connection based on the communication request.

3. An apparatus according to claim 2, wherein the at least one memory and stored computer program code are configured, with the at least one processor, to further cause the apparatus to request a session establishment for the service between the apparatus and at least one communication entity in response to receipt of the communication request.

4. An apparatus according to claim 1, wherein the at least one memory and stored computer program code are configured, with the at least one processor, to further cause the apparatus to receive a communication request for the service from the serving entity, and to determine the requirement of the user connection based on the received communication request.

5. An apparatus according to claim 4, wherein the communication request comprises an indication of an instant communication session with a user of the apparatus, and wherein the at least one memory and stored computer program code are configured, with the at least one processor, to further cause the apparatus to receive the indication of the instant communication session from the serving entity via the core network.

6. An apparatus according to claim 1, wherein the at least one memory and stored computer program code are configured, with the at least one processor, to cause the apparatus to cause request of the pre-session establishment between the apparatus and the serving entity by using a session initiation protocol message.

7. An apparatus according to claim 1, wherein the at least one memory and stored computer program code are configured, with the at least one processor, to cause the apparatus to cause activation of the association with the data network by using a packet data protocol context.

8. A system, comprising:
a first processor configured to
request, for a service, pre-session establishment between a communication entity and a serving entity supporting the service, from the serving entity, the pre-session being entered into from an inactive state,
cause activation of an association with a data network for the service via a core network, and
determine a requirement of a user connection for the service, wherein
the first processor is configured to request the pre-session establishment before the requirement of the user connection is determined by the first processor, and wherein
the first processor is configured to cause activation of the association with the data network for the service after the request for the pre-session establishment when the requirement of the user connection for the service is determined;
a second processor configured to
receive the request for the pre-session establishment for the service between the communication entity and the serving entity from the communication entity,
perform the pre-session establishment for the service between the communication entity and the serving entity, and
cause a pre-session establishment indication indicating the pre-session establishment for the service between the communication entity and the serving entity to be sent towards the communication entity, wherein the pre-session establishment indication comprises a media authorization token; and
a network configured to communicate the data between the communication entity and the data network in accordance with the service, wherein the service is supported by the serving entity, and wherein the network is configured to store the pre-session establishment indication indicating the pre-session establishment between the communication entity and the serving entity for the service.

9. A method, comprising:
causing requesting, for a service, pre-session establishment between a communication entity and a serving entity supporting the service, from the serving entity, the pre-session being entered into from an inactive state;
determining a requirement of a user connection for the service;
receiving a pre-session establishment indication indicating the pre-session establishment for the service from the serving entity; and
causing activation of an association with a data network for the service via a core network, wherein
the causing requesting comprises causing requesting the pre-session establishment before the requirement of the user connection is determined, and
the pre-session establishment indication comprises a media authorization token.

10. A computer readable storage medium storing a computer program, the program configured to control a processor to perform a process, the process comprising:
causing requesting, for a service, pre-session establishment between a communication entity and a serving entity supporting the service, from the serving entity, the pre-session being entered into from an inactive state;
determining a requirement of a user connection for the service;
receiving a pre-session establishment indication indicating the pre-session establishment for the service from the serving entity; and
causing activation of an association with a data network for the service via a core network, wherein
the pre-session establishment is requested before the requirement of the user connection is determined, and
the pre-session establishment indication comprises a media authorization token.

11. An apparatus, comprising:
means for causing requesting, for a service, pre-session establishment between a communication entity and a serving entity supporting the service, from the serving entity, the pre-session being entered into from an inactive state;
means for causing activation of an association with a data network for the service via a core network;
means for receiving a pre-session establishment indication indicating the pre-session establishment for the service from the serving entity; and
means for determining a requirement of a user connection for the service, wherein
the means for causing requesting comprise means for causing requesting the pre-session establishment before the requirement of the user connection is determined,
the means for causing activation comprises means for causing activation of the association with the data network for the service after the request for the pre-session establishment when the requirement of the user connection for the service is determined, and
the pre-session establishment indication comprises a media authorization token.

12. A method according to claim 9, further comprising:
receiving a communication request for the service from a user; and
determining the requirement of the user connection based on the communication request.

13. A method according to claim 12, wherein causing requesting of a session establishment for the service occurs in response to receipt of the communication request.

14. A method according to claim 9, further comprising:
receiving a communication request for the service from the serving entity; and
determining the requirement of the user connection based on the received communication request.

15. A method according to claim 14, wherein the communication request comprises an indication of an instant communication session with a user, the method further comprising:
receiving the indication of the instant communication session from the serving entity via the core network.

16. A method according to claim 9, wherein the requesting of the pre-session establishment between the communication entity and the serving entity is performed using a session initiation protocol message.

17. A method according to claim 9, wherein the causing activation of the association with the data network is performed using a packet data protocol context.

18. A system according to claim 8, wherein the second processor is configured to cause a communication request for the service to be sent towards the communication entity, the communication request comprising an indication of an instant communication session with a user of the communication entity.

19. A system according to claim 8, wherein the serving entity comprises an Internet protocol multimedia subsystem network comprising a push to talk over cellular application server.

20. A system according to claim 8, wherein the serving entity comprises an Internet protocol multimedia subsystem network comprising a proxy-call state control function.

21. A system according to claim 8, wherein the network is configured to cause activation of the association with the data network for the service based on the pre-session establishment indication.

22. A system according to claim 8, wherein the network comprises a general packet radio service network comprising a gateway general packet radio service support node that is configured to provide access to a data network comprising the Internet.

23. An apparatus according to claim 1, wherein the pre-session establishment is initiated responsive to registration to a push-to-talk server.

24. A method according to claim 9, wherein the pre-session establishment is initiated responsive to registration to a push-to-talk server.

* * * * *